F. HEUER.
CONVERTIBLE GAS HARP.
APPLICATION FILED AUG. 19, 1908.
933,072.
Patented Sept. 7, 1909.
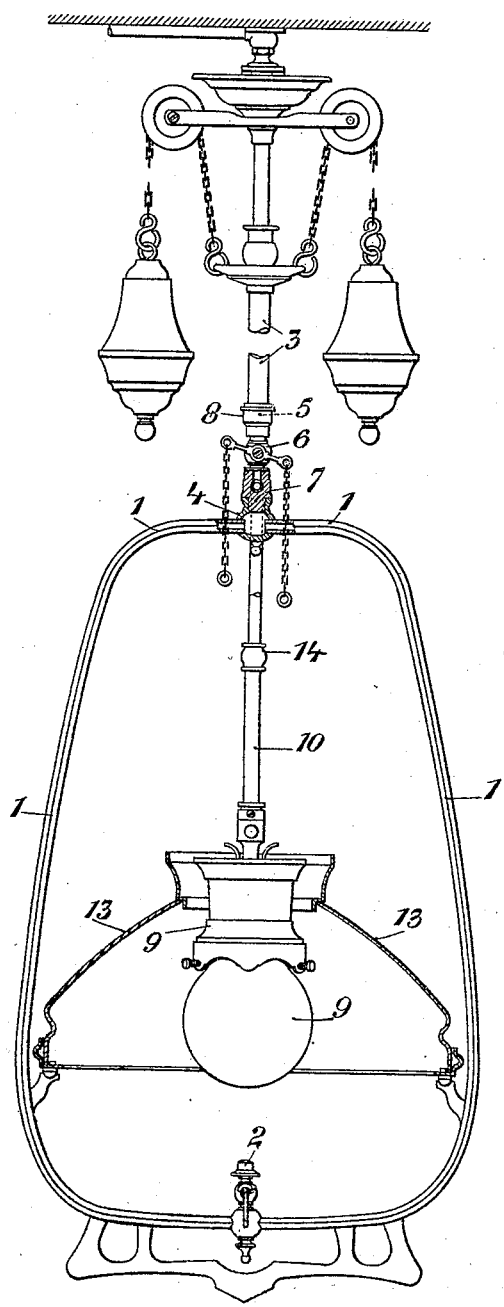
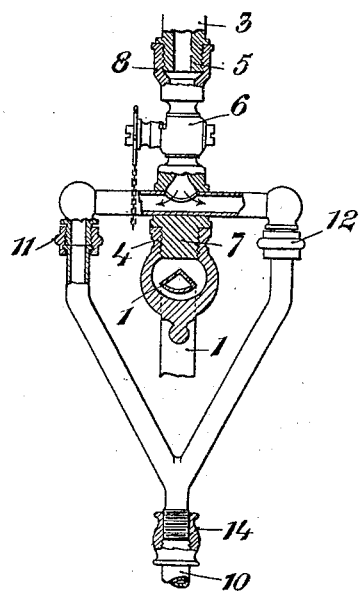
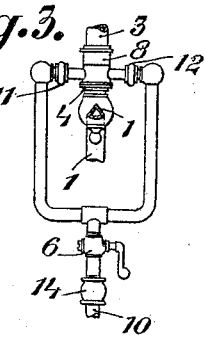
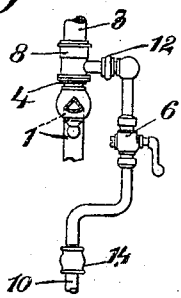
Witnesses.
Inventor.
Franz Heuer
By James L. Norris
Atty.
ANDREW. B. GRAHAM CO., PHOTO-LITHOGRAPHERS, WASHINGTON, D. C.

UNITED STATES PATENT OFFICE.

FRANZ HEUER, OF WEIMAR, GERMANY.

CONVERTIBLE GAS-HARP.

933,072.  Specification of Letters Patent.  Patented Sept. 7, 1909.

Application filed August 19, 1908. Serial No. 449,336.

*To all whom it may concern:*

Be it known that I, FRANZ HEUER, gas-works assistant official, a subject of the German Emperor, residing at Weimar, Grand Duchy of Saxe-Weimar-Eisenach, Germany, have invented certain new and useful Improvements in Convertible Gas-Harps, of which the following is a specification.

My invention relates to an arrangement for converting a pendent gas lamp or so-called "harp light" having an upright incandescent gas burner, into one with inverted incandescent gas burner.

In accordance with the present invention I employ a vertical gas-pipe branched out so as to pass around the upper part of the "harp" or suspension frame, and back to the vertical center line, and which pipe at its lower end carries the inverted incandescent gas burner. The pipe is interposed between the socket at the top of the "harp" or suspension light, and the vertical gas-pipe ordinarily connected thereto.

In order that the invention may be better understood drawings are appended showing various forms of execution of the arrangement, and in which:—

Figures 1 and 2 show two elevations, partly in section, taken at an angle of 90 degrees to each other. Figs. 3 and 4 illustrate modifications.

In Figs. 1 and 2 is illustrated a "harp" gas light, arranged to pull down, and having a telescopic tube and weights, and fitted with an upright incandescent gas light burner, and which it is desired to convert into one with an inverted incandescent burner. For this purpose the usual burner is first removed from the "harp" frame 1, and the screw socket with tap, may be closed by a screw cap 2, and the "harp" frame is detached from the pipe 3 carrying it. When this has been effected the arrangement forming the subject matter of the present invention is inserted between the connecting screw socket 4 of the "harp" frame 1 and the screw nozzle 5 of the vertical gas-pipe 3. In order to facilitate this, the arrangement, which is provided with a gas valve 6 in any desired part thereof, has at its lower end a solid screw plug 7 designed to be screwed into the "harp" frame 1 and at its upper end a sleeve 8 with an internal screw thread. The arrangement is attached to the "harp" frame 1 by means of its screw plug 7 screwed into the gas pipe socket 4 or the "harp" frame 1 and to the gas pipe 3 by means of the sleeve 8, screwed upon the screw-threaded nozzle 5 of the gas pipe.

The vertical gas pipe 10 of the arrangement, carrying at its lower end the inverted incandescent gas light burner 9, and which is situated in the line of extension of the gas pipe 3, is bifurcated underneath the upper part of the "harp" frame 1, into two branches, joined to two branch pipes arranged above the screw plug 7 for attaching the "harp" frame. In order to permit the insertion of the arrangement between the gas pipe 3 and the connecting screw socket 4 of the "harp" frame the bifurcated conduit of the arrangement is provided with two unions 11 and 12 having screw-threaded collars. By these screw unions the conduit pipe 10 together with the inverted incandescent gas light burner 9 attached thereto, is joined to the parts 6, 7 and 8 of the arrangement, which have been previously mounted. In this way the pull-down "harp" gas light with upright incandescent gas light burner has now been converted into one with an inverted incandescent burner, and is ready for use at once.

The form of the bifurcation of the gas conduit 10 of the arrangement can be varied as desired. Fig. 3 shows a modification of this form, and it is immaterial at what point the gas tap 6 is inserted in the arrangement. In the forms illustrated in Figs. 1 and 2 it is above the "harp" 1; in the form shown in Fig. 3, it is inside the "harp". It is also immaterial at what point the screw collar unions 11 and 12 are provided, whether on the vertical branches of the bifurcation as in Fig. 2, or on the horizontal branch pipes as in Fig. 3. In the case of the bifurcated pipe 10 one branch of the bifurcation may be solid so that only the other branch is perforated for the passage of gas. In some instances the pipe 10 is not bifurcated but only bent outward and back again, around one side of the "harp" as shown in Fig. 4 and in this form the gas tap 6 may be arranged in the bent-out part and the screw collar union 12 may be inserted in the upper horizontal portion of the conduit.

By making the screw plug 7 for fixing the "harp" light solid the gas is prevented from passing through the arrangement and entering the hollow interior of the "harp" frame 1. In order to be able to conveniently adapt the arrangement or its gas conduit 10 to the height of various forms of "harp" or suspension lights a screw socket 14 may be inserted in the pipe 10 to enable a longer or shorter length of pipe upon the pipe 10 to be connected to the arrangement. Of course in the place of the screw collar unions referred to any other connection which is easily detachable and makes a thoroughly tight joint may be adopted.

Having now particularly described and ascertained the nature of my said invention and in what manner the same is to be performed I declare that what I claim is:—

1. An inverted burner attachment for gas harps comprising a solid plug for connection with a supply pipe and having means for attachment to the gas harp, said plug having a bore leading from the supply pipe, a valve interposed in said bore, and a pendent pipe connected to said plug and communicating with the bore thereof, said pendent pipe having an off-set upper portion and carrying at its lower end an inverted burner attachment.

2. An inverted burner attachment for gas harps comprising a plug having a solid lower portion and having means for attachment to a supply pipe, said plug having a bore communicating with said supply pipe, a pipe pendent from said plug, communicating with said bore and having an off-set upper portion, an inverted burner provided at the lower end of said pendent pipe, and valve means for the pendent pipe.

3. An inverted burner attachment for gas harps comprising a plug having a solid lower portion, said plug having means for attachment to said supply pipe and having also a bore communicating with said supply pipe, a pipe member passed transversely through the plug and communicating with the bore, and a pendent pipe comprising an upper section, a detachable connection between said upper section and said pipe member, a lower section, a detachable connection between said upper section and said lower section, and an inverted burner provided at the end of said lower section.

In testimony whereof I have hereunto set my hand in presence of two subscribing witnesses.

FRANZ HEUER.

Witnesses:
 GUSTAV LAUTER, Jr.,
 CARL MADES.